US006959473B1

(12) United States Patent
Anibas

(10) Patent No.: US 6,959,473 B1
(45) Date of Patent: Nov. 1, 2005

(54) WOODWORK REMOVAL DEVICE

(76) Inventor: Kevin J. Anibas, 2136 4th St., Eau Claire, WI (US) 54703

(*) Notice: Subject to any disclaimer, the term of this patent is extended or adjusted under 35 U.S.C. 154(b) by 151 days.

(21) Appl. No.: 10/719,482

(22) Filed: Nov. 24, 2003

(51) Int. Cl.[7] .............................................. B23P 19/04
(52) U.S. Cl. ...................................................... 29/239
(58) Field of Search .......................... 29/239, 254, 275, 29/267, 426.4, 426.5; 254/25, 104

(56) References Cited

U.S. PATENT DOCUMENTS

| | | | | |
|---|---|---|---|---|
| 2,464,103 | A * | 3/1949 | Swenson | 29/239 |
| 3,309,764 | A * | 3/1967 | Klatt, Jr. | 29/239 |
| 3,987,827 | A | 10/1976 | Mills | |
| 4,080,734 | A | 3/1978 | Barbour | |
| 4,433,463 | A * | 2/1984 | DuVal | 29/239 |
| 5,207,126 | A | 5/1993 | Schaben | |
| 5,301,429 | A | 4/1994 | Bundy | |
| 5,322,264 | A | 6/1994 | Giambro | |
| 5,480,507 | A | 1/1996 | Arnold | |
| 5,577,711 | A | 11/1996 | Shine | |
| 5,695,171 | A | 12/1997 | Shine | |
| 6,161,824 | A | 12/2000 | Gustavson | |

* cited by examiner

*Primary Examiner*—Robert C. Watson
(74) *Attorney, Agent, or Firm*—Tipton L. Randall

(57) ABSTRACT

Disclosed is a device for removing woodwork and trim from the interior or exterior of buildings. Its function is such that damage to the woodwork, and to the wall from which it is removed, is minimized or eliminated. In operation, the device is first driven between the wall and the woodwork to be removed. A specially shaped bar is then inserted between the base of the device and a spring loaded lifter plate. When this bar is pivoted, the lifter plate is moved away from the base, wedging the woodwork loose. Since a relatively large surface area acts on the wall and the woodwork, gouging or other damage is unlikely. Removed trim pieces may be reinstalled or salvaged for use on other projects.

13 Claims, 5 Drawing Sheets

WOODWORK REMOVAL DEVICE

CROSS-REFERENCE TO RELATED APPLICATION, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention is a device for removing woodwork and trim from the interior or exterior of buildings.

2. Background Information

This invention applies to removing woodwork and trim from the interior or exterior of buildings with minimal or no damage to the woodwork or to the wall from which it is removed.

Trades people, such as carpenters, electricians, window and door replacement contractors, telephone and cable TV installers, and carpet installers, frequently find it necessary to remove woodwork or trim in the course of their work. Often, especially in older homes, this woodwork is brittle and fastened with a surprising number of larger-than-necessary nails. Common tools for this job are putty knives and pry bars. Because these tools present hard steel edges and small surface areas to the wall and the woodwork, damage such as gouging, cracking, or scratching is likely. Time and money are wasted, and the goodwill of the building owner and the trades person is sometimes strained while the damage is repaired. Historic homes and buildings may have custom or out-of-production woodwork which is no longer available should a section of it be destroyed when being removed. Special knives can be made to duplicate the molding, but only at significant cost. Utility installation, building, or remodeling costs can be lessened significantly, and materials saved, if woodwork can be reused, or if salvaged trim can be used in place of new.

Applicant has invented a woodwork removal device that minimizes or eliminates damage to the woodwork and to the wall from which it is removed. It also provides a less tedious and faster method than using putty knives and pry bars for this task. The device acts on both the wall and the woodwork with a relatively large surface area, greatly decreasing the chance of damage. This allows the trim to be reinstalled or salvaged for use in other projects. Time and materials are saved, and related repair, building, or remodeling costs are lessened.

SUMMARY OF THE INVENTION

The invention is a device for removing woodwork and trim from the interior or exterior of buildings. The device comprises a planar, "T" shaped body member which tapers to an edge at the bottom of its vertical wall. At the top of the wall, a horizontal protrusion extends to act as a striking surface, and to locate a handle which may be pinned on either side of the striking surface for left or right-hand use. The body member is pocketed to accept a lifter plate member shaped to match the shape of the vertical wall. The lifter plate member mounts on pins and is spring loaded so that it normally rests in the pocket of the body member. A stop structure is provided to protect the lifter plate pins and springs, should the device be driven too deeply behind the woodwork to be removed. An "L" shaped bar member fits into another pocket of the body member which is behind the lifter plate member. The device functions as follows. The body member is placed against the wall with its hard edge against the woodwork to be removed. The device is then driven between the wall and the woodwork. Next, the "L" shaped bar member is tapped into the bar pocket of the body member behind the lifter plate member. When the bar member is pivoted, the lifter plate member is moved away from the body member, and the woodwork is moved away from the wall and loosened. If the woodwork is sufficiently loosened, it may then be removed. If not, a shim, such as a block of wood, is placed behind the loosened woodwork, and the bar member pivoted back so that the lifter plate member is retracted. The device is then advanced forward down the length of the woodwork, and the bar member is again pivoted. This is repeated until the woodwork is loosened sufficiently to be removed.

In a preferred embodiment of the invention, the device for removal of woodwork or trim from a wall includes a planar tool body member having a top portion, a center portion, and a bottom portion. The bottom portion tapers to a hard edge, the center portion includes, in register, a lever pocket and a lifter plate pocket, and the top portion includes a striking surface extending perpendicularly from one side of the planar tool body member. The striking surface includes an aperture accessing the lever pocket and the lifter plate pocket. A planar lifter plate member is biasedly mounted against the lifter plate pocket of the tool body member. An angled, lever bar member having a cross section greater in width than in thickness is tapered at one end to facilitate insertion of the tapered end into the tool body member lever pocket via the aperture in the striking surface.

In operation, the planar tool body member is driven between a wall and a trim piece secured to the wall. The angled, lever bar member is inserted into the lever pocket and pivoted at one edge to force the lifter plate member away from the lifter plate pocket of the planar tool body member, thereby separating the trim piece from the wall.

DESCRIPTION OF THE EMBODIMENTS

Nomenclature

1 Planar Tool Body Member
2 Lifter Plate Member
3 Lifter Plate Pin Member
4 Lifter Plate Pin Member Hole
5 Spring Member
6 Handle Member
7 Handle Pin Member
8 Handle Pin Member Hole
9 Lever Bar Member
10 Hard Edge
11 Striking Surface
12 Access Aperture
13 Lifter Plate Pocket
14 Lever Bar Pocket
15 Stop Structure Protecting the Lifter Plate Pins and Springs
16 Section of Woodwork or Trim
17 Wall Construction Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
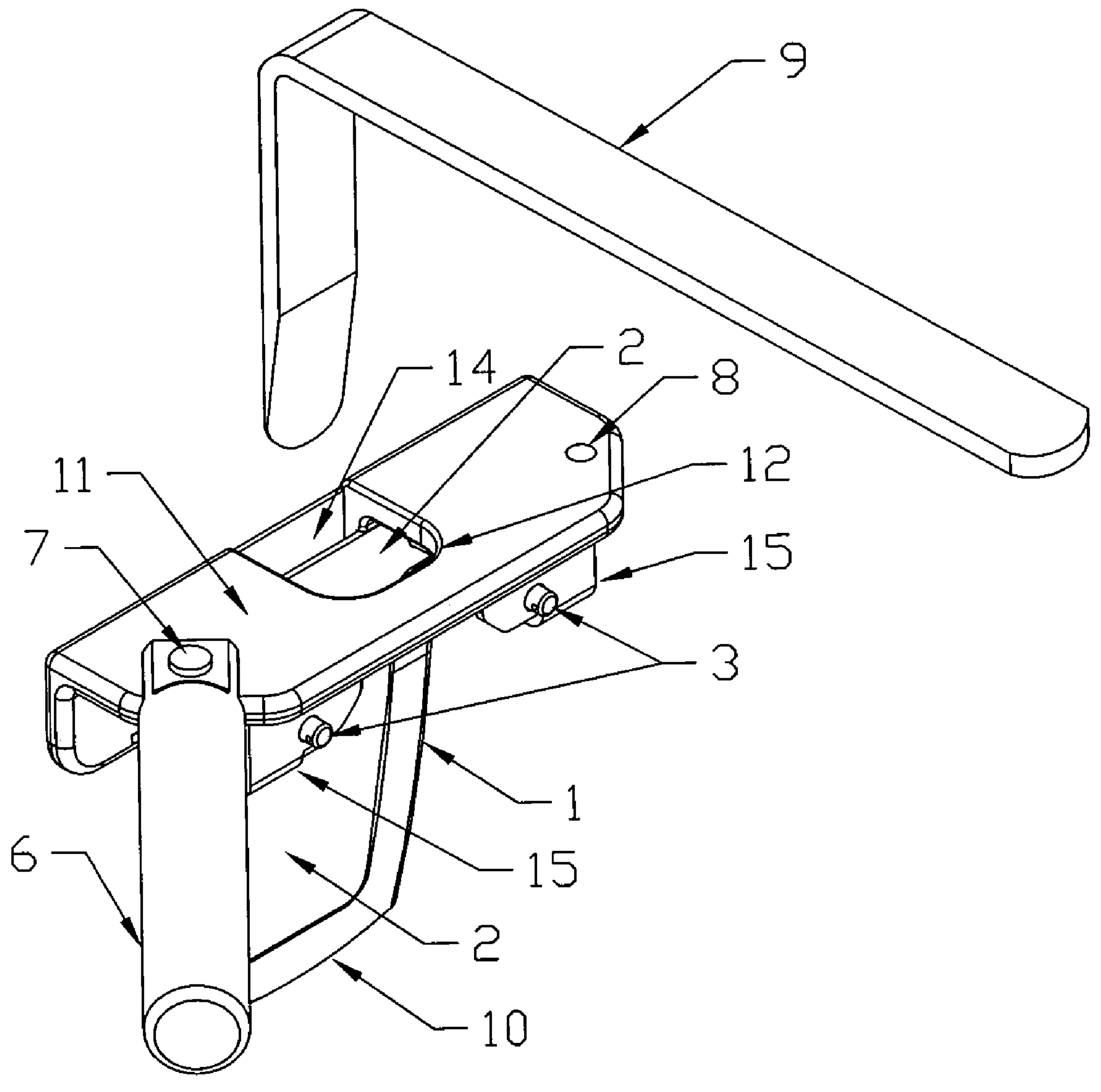
FIG. 1 is a perspective view of the invention showing the body, lifter plate, handle, pins, striking surface, lever bar, and other features.
Figure 2:
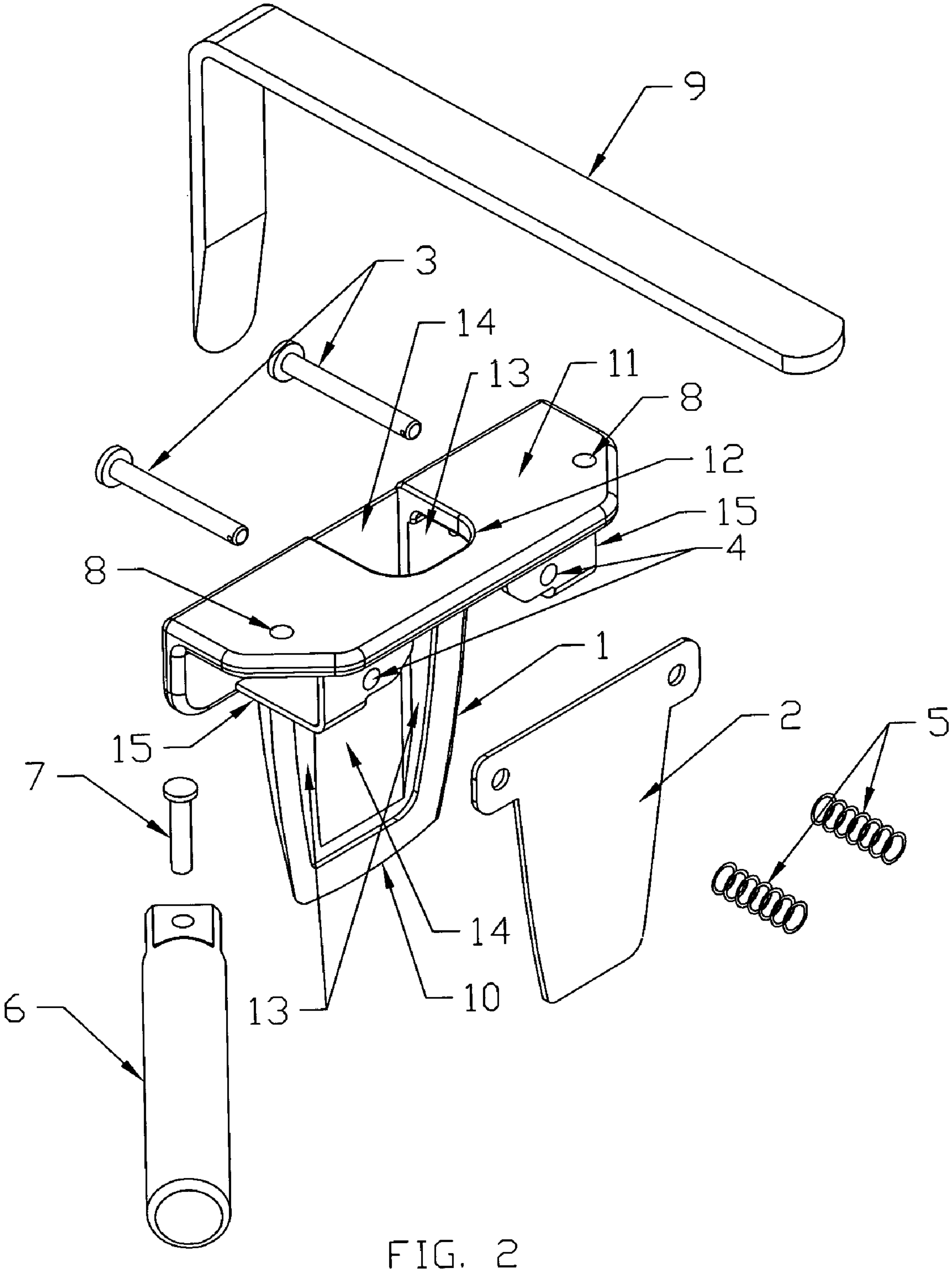
FIG. 2 is an exploded perspective view of the invention showing the body, lifter plate, springs, handle, pins, striking surface, lever bar, and other features.

The invention is an assembly for removal of woodwork or trim from the wall of a building. Referring now to FIGS. 1 and 2, several views of the assembly are shown. The assembly includes a tool body member 1 having a top portion, a center portion and a bottom portion. The bottom portion tapers gradually to a hard edge 10 at its lowest point, and the top portion features a perpendicular protrusion which functions as a striking surface 11. This striking surface 11 features an access aperture or cutout area 12 for the insertion of the lever bar member 9. The lever bar member 9 is "L" shaped with a cross-section greater in width than in thickness, and with one or both legs being tapered at the end to ease insertion into the lever bar pocket 14 provided for the lever bar member 9. The striking surface 11 of the body member 1 also features holes 8 which accept a handle pin member 7 to locate a handle member 6 on either side of the body member 1 for left-handed or right-handed use. If working space is limited, the handle member 6 may be removed from the body member 1 entirely. The handle pin member 7 is secured in place by a cotter pin, circlip, or other feature. Incorporated into the body member 1 is a lifter plate pocket 13, which accepts a lifter plate member 2 shaped to fit into it. Also incorporated into the body member 1 is a lever bar pocket 14, which accepts a lever bar member 9 shaped to fit into it. The pockets 13, 14 are arranged in register, and the lifter plate pocket 13 has a surface area greater than the surface area of the lever bar pocket 14. The lever bar pocket 14 is deeper than the lifter plate pocket 13 so that the lever bar member 9, when inserted, is behind the lifter plate member 2. The lifter plate member 2 is held movably in the lifter plate pocket 13 by lifter plate pin members 3, which are located by holes 4 in the body member 1 and in a stop structure 15 provided to protect the lifter plate pin members 3 and spring members 5 as the device is driven between a wall 17 and a trim piece 16. The lifter plate pin members 3 capture spring members 5, which hold the lifter plate member 2 against the base of the lifter plate pocket 13. The lifter plate pin members 3 extend from the tool body member 1 adjacent and parallel the top portion striking surface 11. The lifter plate pin members 3 are secured in place by cotter pins, circlips, or other features. Preferably, the tool body member 1, the lifter plate member 2 and the lever bar member 9 are fabricated from a metallic material, such as a steel alloy or cast aluminum, for strength and durability.

Figure 3:
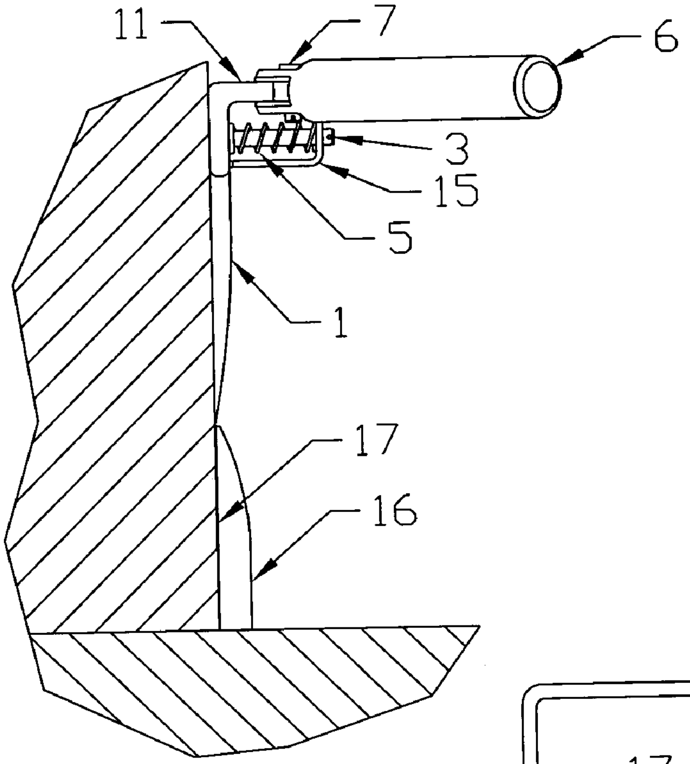
FIG. 3 is a side view of the invention in position to be driven between the wall and the woodwork to be removed.
Figure 4:
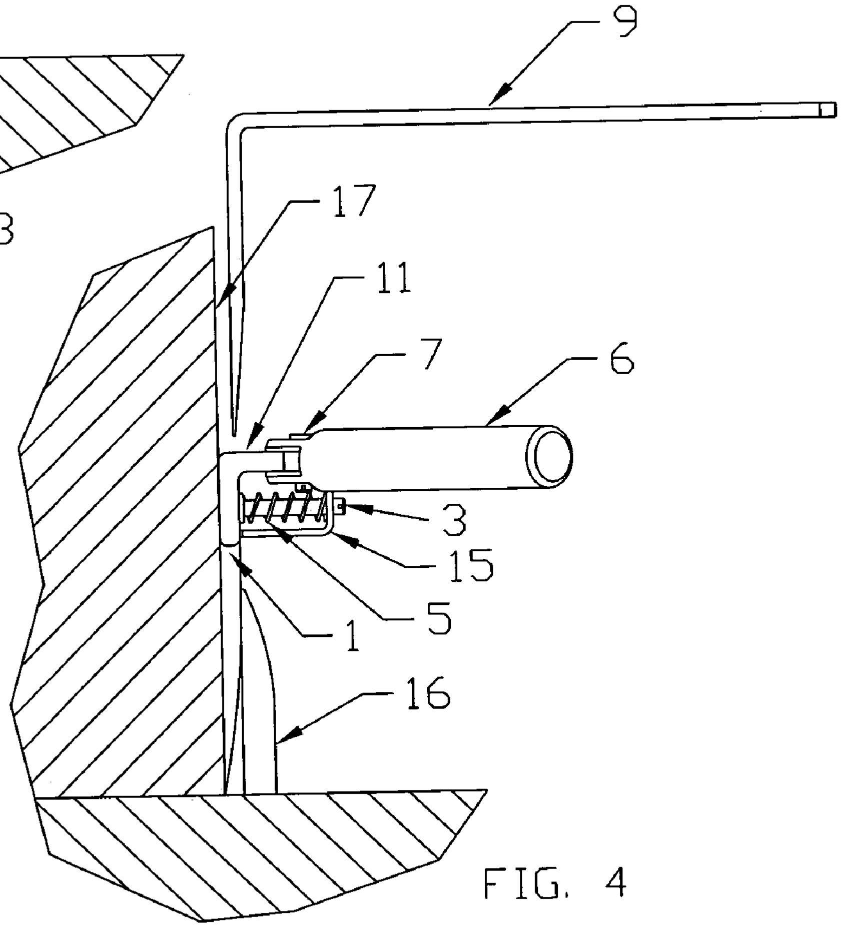
FIG. 4 is a side view of the invention in position after being driven between the wall and the woodwork to be removed, with the lever bar positioned for insertion into the lever bar pocket behind the lifter plate.
Figure 5:
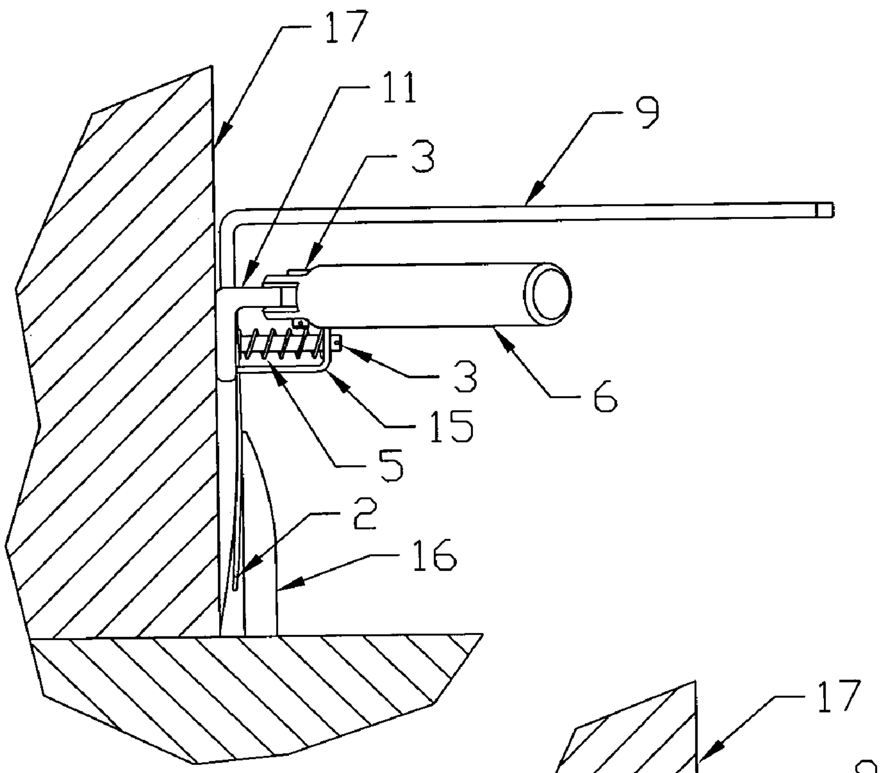
FIG. 5 is a side view of the invention in place between the wall and the woodwork, with the lever bar inserted into the lever bar pocket behind the lifter plate.
Figure 6:
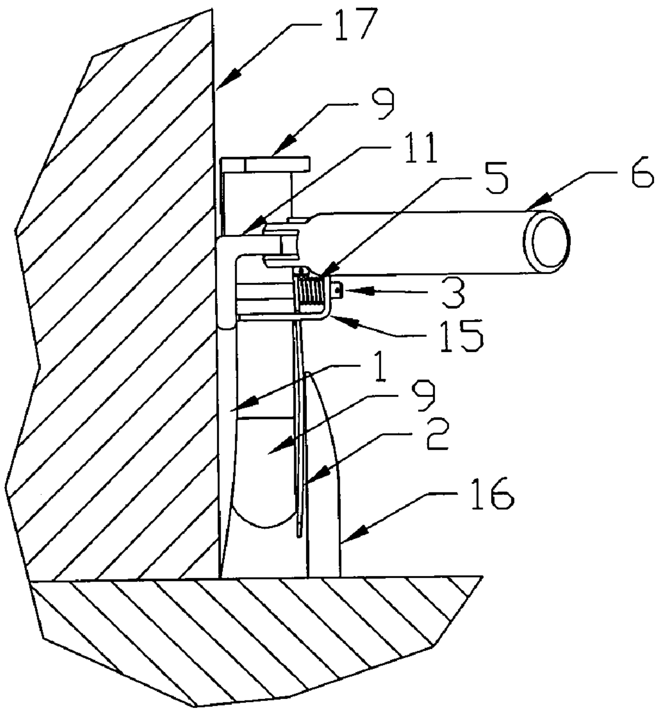
FIG. 6 is a side view of the invention in place between the wall and the woodwork, with the inserted lever bat rotated so that the lifter plate is moved away from the body, and the woodwork is moved away from the wall.
Figure 7:
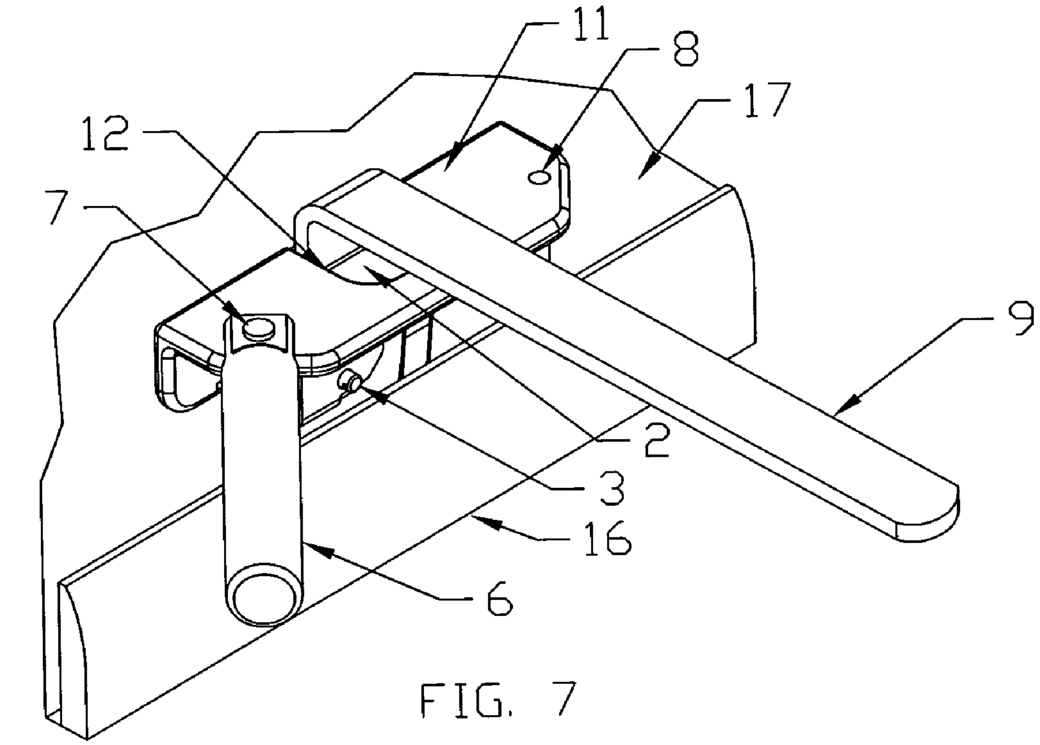
FIG. 7 is a perspective view of the invention in place between the wall and the woodwork, with the lever bar inserted into the lever bar pocket behind the lifter plate.
Figure 8:
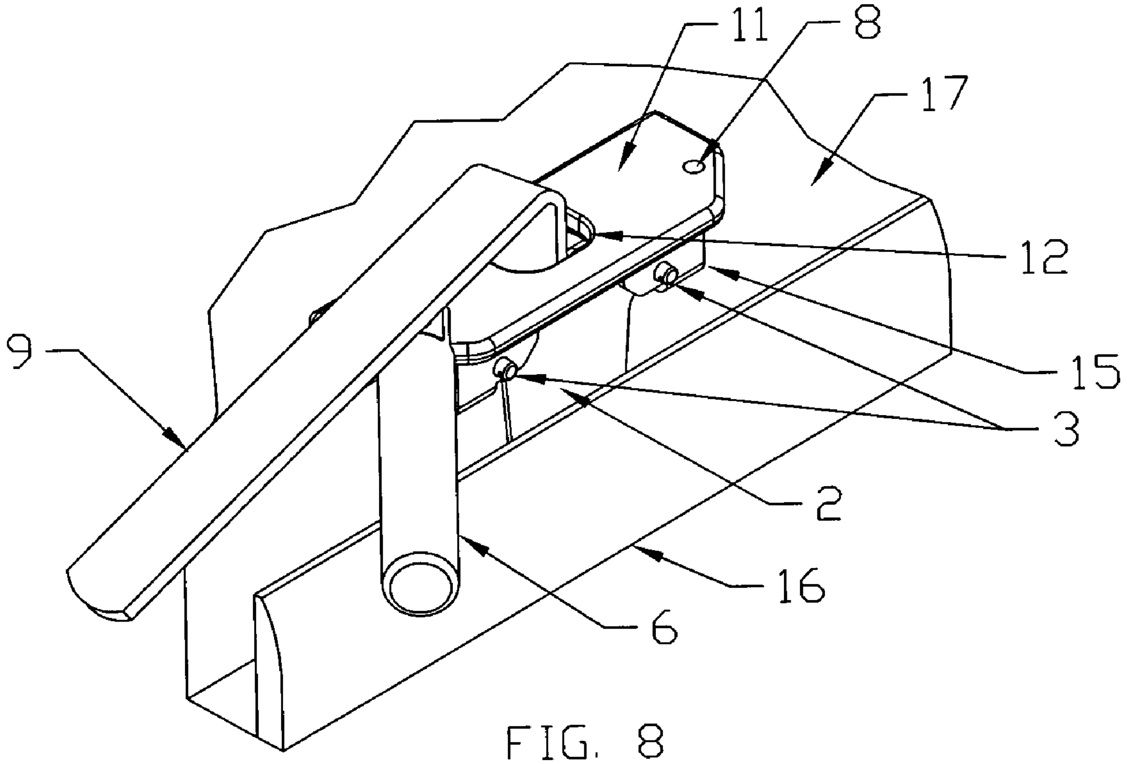
FIG. 8 is a perspective view of the invention in place between the wall and the woodwork with the inserted lever bar rotated so that the lifter plate is moved away from the body and the woodwork is moved away from the wall.

Referring now to FIGS. 3–6, the functioning of the device is illustrated. As shown in FIG. 3, first the body member 1 is held to the wall 17 with the hard edge 10 of the device against the woodwork 16 to be removed. The device is then driven between the wall 17 and the woodwork 16 by striking the striking surface 11 with a hammer, as shown in FIG. 4. With the device wedged between the wall 17 and the woodwork 16 to be removed, the lever bar member 9 is tapped into the lever bar pocket 14 of the body member 1, as illustrated in FIG. 5. The lever bar member 9 is then pivoted on one edge by moving the horizontal leg of the lever bar member 9 toward the wall 17, so that the vertical leg of the lever bar member 9 overcomes the spring members 5 and wedges the lifter plate member 2 away from the body member 1. This action, in turn, wedges the woodwork 16 away from the wall 17, as shown in FIG. 6. The lever bar member 9 is then pivoted back to its initial position, so that the lifter plate member 2 moves back into the lifter plate pocket 13 of the body member 1. The device is then advanced along the length of the woodwork 16 to be removed, and the lever bar member 9 actuated as above, until the woodwork 16 is free of the wall 17, or acceptably loosened. Front perspective views of the device, the wall 17 and the woodwork 16 of FIGS. 5 and 6 are shown in FIGS. 7 and 8.

While the invention has been particularly shown and described with reference to preferred embodiments thereof, it will be understood by those skilled in the art that various changes in form and details may be made therein without departing from the spirit and scope of the invention.

I claim:

1. A device for removal of woodwork or trim from the interior or exterior of buildings including;

(a) a planar tool body member having a top portion, a center portion, and a bottom portion, the bottom portion tapering to a hard edge, the center portion including, in register, a lever pocket and a lifter plate pocket, the top portion including a striking surface extending perpendicularly from one side of the planar tool body member, the striking surface including an aperture accessing the lever pocket and the lifter plate pocket;

(b) a planar lifter plate member biasedly mounted against the lifter plate pocket of the tool body member; and (c) an angled, lever bar member having a cross section greater in width than in thickness, the lever bar member tapered at one end to facilitate insertion thereof into the tool body member lever pocket via the aperture in the striking surface;

(d) whereby the planar tool body member is driven between a wall and a trim piece secured to the wall, the angled, lever bar member is inserted into the lever pocket and pivoted at one edge thereof, to force the lifter plate member away from the lifter plate pocket of the planar tool body member, thereby separating the trim piece from the wall.

2. The device for removal of woodwork or trim from the interior or exterior of buildings of claim 1 wherein, the lifter plate member is biasedly mounted against the lifer plate pocket on pin members extending from the tool body member, the pins capturing spring members which provide biasing of the lifter plate member.

3. The device for removal of woodwork or trim from the interior or exterior of buildings of claim 2 wherein, the pin members extend from the tool body member adjacent and parallel the top portion striking surface.

4. The device for removal of woodwork or trim from the interior or exterior of buildings of claim 2, further including a stop structure secured to the tool body member, the stop structure protecting the pin members and biasing spring members when driving the tool body member between a wall and a trim piece.

5. The device for removal of woodwork or trim from the interior or exterior of buildings of claim 4 wherein, the pin members extend from the stop structure to the tool body member.

6. The device for removal of woodwork or trim from the interior or exterior of buildings of claim 1, further including a handle member removably secured to the striking surface for positioning the tool body member against a wall.

7. The device for removal of woodwork or trim from the interior or exterior of buildings of claim 6 wherein, the striking surface includes pin-accepting apertures at opposite ends thereof, the handle member secured by a handle pin member inserted into a selected pin-accepting aperture.

8. The device for removal of woodwork or trim from the interior or exterior of buildings of claim 1 wherein, the lifter plate pocket has a surface area greater than the lever pocket surface area.

9. The device for removal of woodwork or trim from the interior or exterior of buildings of claim 1 wherein, the tool body member, the lifter plate member and the lever bar member are fabricated from a metallic material.

10. A device for removal of woodwork or trim from the interior or exterior of buildings including;

(a) a planar tool body member having a top portion, a center portion, and a bottom portion, the bottom portion tapering to a hard edge, the center portion including, in register, a lever pocket and a lifter plate pocket, the top portion including a striking surface extending perpendicularly from one side of the planar tool body member, the striking surface including an aperture accessing the lever pocket and the lifter plate pocket;

(b) a planar lifter plate member biasedly mounted against the lifter plate pocket of the tool body member on pin members extending from the tool body member, the pins capturing spring members which provide biasing of the lifter plate member;

(c) a stop structure secured to the tool body member, the stop structure protecting the pin members and biasing spring members upon driving the tool body member between a wall and a trim piece;

(d) an angled, lever bar member having a cross section greater in width than in thickness, the lever bar member tapered at one end to facilitate insertion thereof into the tool body member lever pocket via the aperture in the striking surface; and (e) a handle member removably secured to the striking surface for positioning the tool body member against a wall;

(f) whereby the planar tool body member is driven between a wall and a trim piece secured to the wall, the angled, lever bar member is inserted into the lever pocket and pivoted at one edge thereof, to force the lifter plate member away from the lifter plate pocket of the planar tool body member, thereby separating the trim piece from the wall.

11. The device for removal of woodwork or trim from the interior or exterior of buildings of claim 10 wherein, the striking surface includes pin-accepting apertures at opposite ends thereof, the handle member secured by a handle pin member inserted into a selected pin-accepting aperture.

12. The device for removal of woodwork or trim from the interior or exterior of buildings of claim 10 wherein, the lifter plate pocket has a surface area greater than the lever pocket surface area.

13. The device for removal of woodwork or trim from the interior or exterior of buildings of claim 10 wherein, the tool body member, the lifter plate member and the lever bar member are fabricated from a metallic material.

* * * * *